US011580310B2

(12) United States Patent
Carbune et al.

(10) Patent No.: US 11,580,310 B2
(45) Date of Patent: Feb. 14, 2023

(54) SYSTEMS AND METHODS FOR GENERATING NAMES USING MACHINE-LEARNED MODELS

(71) Applicant: Google LLC, Mountain View, CA (US)

(72) Inventors: Victor Carbune, Winterthur (CH); Alexandru-Marian Damian, Zurich (CH)

(73) Assignee: GOOGLE LLC, Mountain View, CA (US)

(*) Notice: Subject to any disclaimer, the term of this patent is extended or adjusted under 35 U.S.C. 154(b) by 781 days.

(21) Appl. No.: 16/552,253

(22) Filed: Aug. 27, 2019

(65) Prior Publication Data

US 2021/0064921 A1   Mar. 4, 2021

(51) Int. Cl.
| | |
|---|---|
| *G06F 40/56* | (2020.01) |
| *G06K 9/62* | (2022.01) |
| *G06N 20/00* | (2019.01) |
| *G06N 3/08* | (2023.01) |
| *G06F 40/295* | (2020.01) |
| *G06V 10/82* | (2022.01) |
| *G06V 20/30* | (2022.01) |
| *G06N 3/088* | (2023.01) |
| *G06N 3/04* | (2023.01) |

(52) U.S. Cl.
CPC ........... *G06F 40/56* (2020.01); *G06F 40/295* (2020.01); *G06K 9/6218* (2013.01); *G06K 9/6234* (2013.01); *G06K 9/6267* (2013.01); *G06N 3/0454* (2013.01); *G06N 3/0472* (2013.01); *G06N 3/08* (2013.01); *G06N 3/088* (2013.01); *G06N 20/00* (2019.01); *G06V 10/82* (2022.01); *G06V 20/30* (2022.01)

(58) Field of Classification Search
None
See application file for complete search history.

(56) References Cited

U.S. PATENT DOCUMENTS

| | | | |
|---|---|---|---|
| 8,429,103 B1 | 4/2013 | Aradhye et al. | |
| 10,382,379 B1 * | 8/2019 | Zhang | G06F 16/24578 |
| 11,017,173 B1 * | 5/2021 | Lu | G06N 20/00 |
| 11,366,966 B1 * | 6/2022 | Ramsey | G06N 20/00 |
| 2006/0031239 A1 | 2/2006 | Koenig | |

(Continued)

OTHER PUBLICATIONS

Sun, Yaming, et al. "Modeling mention, context and entity with neural networks for entity disambiguation." Twenty-fourth international joint conference on artificial intelligence. 2015. (Year: 2015).*

*Primary Examiner* — Douglas Godbold
(74) *Attorney, Agent, or Firm* — Dority & Manning, P.A.

(57) ABSTRACT

A computing system can include one or more machine-learned models configured to receive context data that describes one or more entities to be named. In response to receipt of the context data, the machine-learned model(s) can generate output data that describes one or more names for the entity or entities described by the context data. The computing system can be configured to perform operations including inputting the context data into the machine-learned model(s). The operations can include receiving, as an output of the machine-learned model(s), the output data that describes the name(s) for the entity or entities described by the context data. The operations can include storing at least one name described by the output data.

21 Claims, 7 Drawing Sheets

(56) References Cited

U.S. PATENT DOCUMENTS

| | | | |
|---|---|---|---|
| 2015/0347399 A1* | 12/2015 | Aue | H04W 4/18 |
| | | | 704/2 |
| 2015/0370787 A1* | 12/2015 | Akbacak | G10L 15/06 |
| | | | 704/2 |
| 2020/0234008 A1* | 7/2020 | Song | G06F 40/30 |
| 2020/0380077 A1* | 12/2020 | Ge | G10L 15/18 |
| 2021/0027771 A1* | 1/2021 | Hall | G06F 40/295 |
| 2021/0034686 A1* | 2/2021 | Hu | G06F 16/9537 |
| 2021/0034701 A1* | 2/2021 | Fei | G06N 3/0454 |
| 2022/0188519 A1* | 6/2022 | Briody | G06N 3/08 |

\* cited by examiner

SYSTEMS AND METHODS FOR GENERATING NAMES USING MACHINE-LEARNED MODELS

FIELD

The present disclosure relates generally to machine-learning. More particularly, the present disclosure relates to systems and methods for generating names using machine-learned models.

BACKGROUND

Currently, automatically generated names are generally generic and not customized for the entity being named. For example, a pseudonym for a user when entering a virtual environment (e.g., a chatroom) can be randomly selected from a predetermined list. The result is a generic pseudonym that is not customized for the user. As another example, text is often anonymized by simply redacting text often including names of people or places. The resulting text can be difficult to read. Accordingly, a system and method for generating names that are relevant or appropriate based on context associated with the entity to be named would be welcomed in the art.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system can include at least one processor and one or more machine-learned models. The machine-learned model(s) can be configured to receive context data that describes one or more entities to be named, and, in response to receipt of the context data, generate output data that describes one or more names for the one or more entities described by the context data. The computing system can include at least one tangible, non-transitory computer-readable medium that stores instructions that, when executed by the at least one processor, cause the at least one processor to perform operations. The operations can include obtaining the context data; inputting the context data into the one or more machine-learned models; receiving, as an output of the one or more machine-learned models, the output data that describes the one or more names for the one or more entities described by the context data; and storing at least one name of the one or more names described by the output data.

Another example aspect of the present disclosure is directed to computer-implemented method for generating one or more names for one or more entities. The method can include obtaining, by one or more computing devices, context data that describes one or more entities to be named; inputting, by the one or more computing devices, the context data into one or more machine-learned models configured to receive the context data, and, in response to receipt of the context data, generate output data that describes the one or more names for the one or more entities described by the context data; receiving, by the one or more computing devices and as an output of the one or more machine-learned models, the output data that describes the one or more names for the one or more entities described by the context data; and storing, by the one or more computing devices, at least one name of the one or more names described by the output data.

Another example aspect of the present disclosure is directed to a computer-implemented method for training one or more machine-learned models to generate one or more names for one or more entities. The method can include inputting, by one or more computing devices into one or more machine-learned models, training context data that describes one or more training entities. The one or more machine-learned models can be configured to receive the training context data, and, in response to receipt of the training context data, generate output data that describes the one or more names for the one or more training entities described by the training context data. The method can include receiving, by the one or more computing devices and as an output of the one or more machine-learned models, the output data that describes the one or more names for the one or more entities described by the training context data; comparing, by the one or more computing devices, the one or more names described by the output data with one or more training names; and adjusting, by the one or more computing devices, parameters of the one or more machine-learned models based on the comparison of the one or more names with the one or more training names.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure is directed to systems and methods for generating one or more names for one or more entities to be named. The systems and methods can leverage one or more machine-learned models to generate the name(s). The systems and methods can be used to generate names for people, characters, places, or other entities that are contextually appropriate or relevant. As one example, names of people, places, etc. in a text body can be replaced with generated names or names to anonymize the text body. Example text bodies include medical reports, articles, police reports, sensitive documents, and the like. As a further example, the generated name(s) can be or include a title or sub-title for the text body. As another example, an anonymous character name can be generated for a person when engaging with a virtual environment, such as a chatroom, videogame, collaborative document editing environment (e.g., Google Docs), or the like. As yet a further example, a brand name for a product, company, etc. can be generated based on information about the product, company, etc.

In some embodiments, the entity to be named can be or include one or more images or videos (e.g., as a photo album or video collection). The context data can include names assigned to the images or videos included in the photo album or video collection and/or photos or images that are not included in the photo album or video collection. Such context data can describe the user's preferences for naming photos, albums, and/or collections. Thus, the systems described herein can be used to generate names for photos, albums, and/or collections according to the user's preferences for such names.

As used herein "names" can contrast with words or phrases that simply describe the entity to be named (e.g., describing what is depicted in an image) in one or more ways. For example, generated names can include made-up words (e.g., as combinations or concatenations of existing words, or combinations of syllables, phonemes, etc. that are common or appropriate based on the context data).

Additionally, names are not necessarily descriptive of the entity being named. For example, "Pierre" can be generated as a name or pseudonym for a French person or character. The name "Pierre" is not descriptive of the person, but nevertheless may be appropriate based on the context data. For example, the name may be appropriate based on the culture, language, dialect, etc. of the entity being named or of the intended audience/reader of the name. As another example, names for products and/or companies are often chosen for a variety of factors and can be non-descriptive of the product and/or company. Such factors can include recognizability, ease of spelling and/or pronunciation in one or more languages or cultures, positive associations (e.g., with power, reliability, etc.), a lack of negative associations (e.g., words having negative cultural connotations are often avoided based on the intended market/audience of the name). However, such names are not necessarily descriptive of the entity being named.

The machine-learned models can be trained to generate contextually appropriate or relevant names based on context data that includes text. The context data can describe the entity or entities to be named, an intended reader of the names, and/or other contextual information. The context data can include geographic location data that describes a location of the entity. Culturally appropriate names can be generated for the entity based on the location data associated with the entity. For instance, a pseudonym can be generated that is suitable or appropriate with respect to the culture of a person for whom the pseudonym is being generated. The pseudonym can be in a language that is spoken by the person, culturally appropriate based on the culture of the person, and/or relevant or appropriate based on other characteristics of the person.

The context data can include a variety of information, such as information about the entity, target reader, situation in which the names are being generated, and/or any other suitable information. For example, when anonymizing a text body, the context data can include some or all of the text body, information about a source of the text body (e.g., type, category, etc.), information about obtaining the text body, and the like. The context data can also include the entity or entities to be named. The context data can also include information about the entity or entities to be named such as a type, category, etc. of the entity or entities to be named. As a result, the generated names or names can be contextually relevant or appropriate for the text body.

The context data can include information about a geographic region associated with the entity and/or intended reader of the name such that the names are appropriate for a geographical region (e.g., based on a country, region within a country, dialect of the geographical region, etc.). The geographical region can be associated with the entity to be named and/or an intended reader or audience of the entity. Thus, culturally appropriate or relevant names can be generated. The context data can also include other information about a target reader of the name or the entity itself, such as age, profession, time period (for a fictional character), and the like. As such, names of people, places, etc. can be generated that are appropriate and/or relevant for the target reader and/or entity. Thus, the generated names can be customized based on the intended reader or audience of the generated names and/or based on information about the entity.

According to one aspect of the present disclosure, a computing system can include one or more machine-learned models that are configured to receive context data that describes one or more entities to be named. In response to receipt of the context data, the machine-learned model(s) can generate output data that describes one or more names for the entity or entities described by the context data. The computing system can be configured to obtain the context data, input the context data into the machine-learned model(s), and receive the output data as an output of the machine-learned model(s). The computing system can be configured to store at least one name described by the output data, for example for display to a user of the computing device or for transmission to another computing device.

In some implementations, the machine-learned models can include various types of models and/or layers. As one example, the machine-learned models can include one or more embedding layers configured to receive the context data, and, in response to receipt of the context data, output one or more embeddings. The embedding(s) can describe feature representations with respect to the context data. The machine-learned models can include one or more clustering layers configured to receive data describing the embedding(s) from the embedding layer(s), and, in response to receipt of the embedding, output the name(s). The embeddings can describe a set of candidate names. The clustering layer(s) or model(s) can rank the candidate names or select a subset of names from the set of candidate names. This configuration can constrain the generated names within an embedding space associated with the embedding(s). As a result, the generated names can be constrained to a particular social and/or cultural context. For instance, the generated names can be constrained to names that are common in a particular geographical region, dialect, language, social setting (e.g., including formal titles as opposed to casual, such as first name only or nicknames) and so forth.

In some implementations, the machine-learned model(s) can include a generator model and/or a discriminator model that have been trained in a generative adversarial network (GAN) configuration. The generator model can be configured to generate new names (e.g., including words not present in the context data). For instance, the generator model can generate the names character-by-character, word-by-word, and/or by generating and assembling multi-letter pieces of the name (e.g., syllable-by-syllable, phoneme-by-phoneme, etc.).

In some implementations, the computing system can be configured to extract at least a portion of the context data from a text body and extract at least one of the entity or entities from the text body. As an example, the computing system can process the text body to identify portion(s) of the text body that should be replaced with generated name(s) and portion(s) of the text body that should be used as context data to generate the name(s).

As another example, the text body can have placeholders for entities (e.g., redacted names), and the computing system can be configured to locate the placeholders and insert the generated name(s) in the respective placeholder(s). The redacted names can be systematically replaced with the generated names such that the relative identify of the respective redacted names is preserved. For instance, each instance of a first redacted name can be replaced with a first generated name, each instance of a second redacted name can be replaced with a second generated name, and so forth. This better preserves the content of the text body as compared with a simple redaction of each name with "[redacted]" or the like.

One or more of the names can be displayed in a user interface of the computing device and/or stored by the computing device. The computing system can select which name to display and/or store from a larger set of names that are described by the data output by the machine-learned model(s). The computing system can select such name(s) based on respective confidence scores with respect to the name(s), which can be output by the machine-learned model(s).

Aspects of the present disclosure are directed to a method for training one or more machine-learned model(s) for generating one or more names for one or more entities to be named. The machine-learned model(s) can be trained based on training context data that describes a plurality of names (e.g., of people, places, etc.) with respect to a geographic area. For example, the training context data can include names of geographic features, such as cities, roads, buildings, and the like, within a geographic area. The training context data can include common names for people and/or common words in a local language, dialect, etc. for the geographical area.

The method can include inputting the training context data and entities to be named (which can be included in the context data) into the machine-learned model(s) and receiving output data from the machine-learned model(s). The output data can describe generated name(s) for the entity or entities that are described by the training context data. The method can include comparing the name(s) described by the output data with one or more training names. The training names can include ground truth names for the entities to be named. The parameters of the machine-learned model(s) can be adjusted based on the comparison of the name(s) with the training name(s). For example, an objective function can describe the comparison between the name(s) and the training name(s). Errors can be propagated through the machine-learned model(s). The parameters can be adjusted based on a gradient of the objective function with respect to the parameters.

As indicated above, the machine-learned models can include various types of models and/or layers. For example, the machine-learned model(s) can include one or more embedding layers or models and/or clustering layers or models. In such implementations, embedding parameters of the embedding layer(s) and/or clustering parameter of the clustering layer(s) can be adjusted during training of the machine-learned model(s). The embedding layer(s) and/or clustering layer(s) can be trained end-to-end and/or separately. Errors can be propagated through the embedding layers and clustering layers in an end-to-end training configuration.

In some implementations, the method can include training a generator model and a discriminator model in a generative adversarial network (GAN) configuration. The generator model can be configured to generate new names. For instance, the generator model can generate the names character-by-character and/or word-by-word. The discriminator model can be trained to determine whether each entity input into the discriminator model is a "real" ground truth name or a "fake" generated name.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web business/product naming service, a web-implement photo album naming and/or organizing service, a document anonymizing service, etc.).

With reference now to the Figures, example embodiments of the present disclosure will be discussed in further detail.

Example Devices and Systems

Figure 1A:
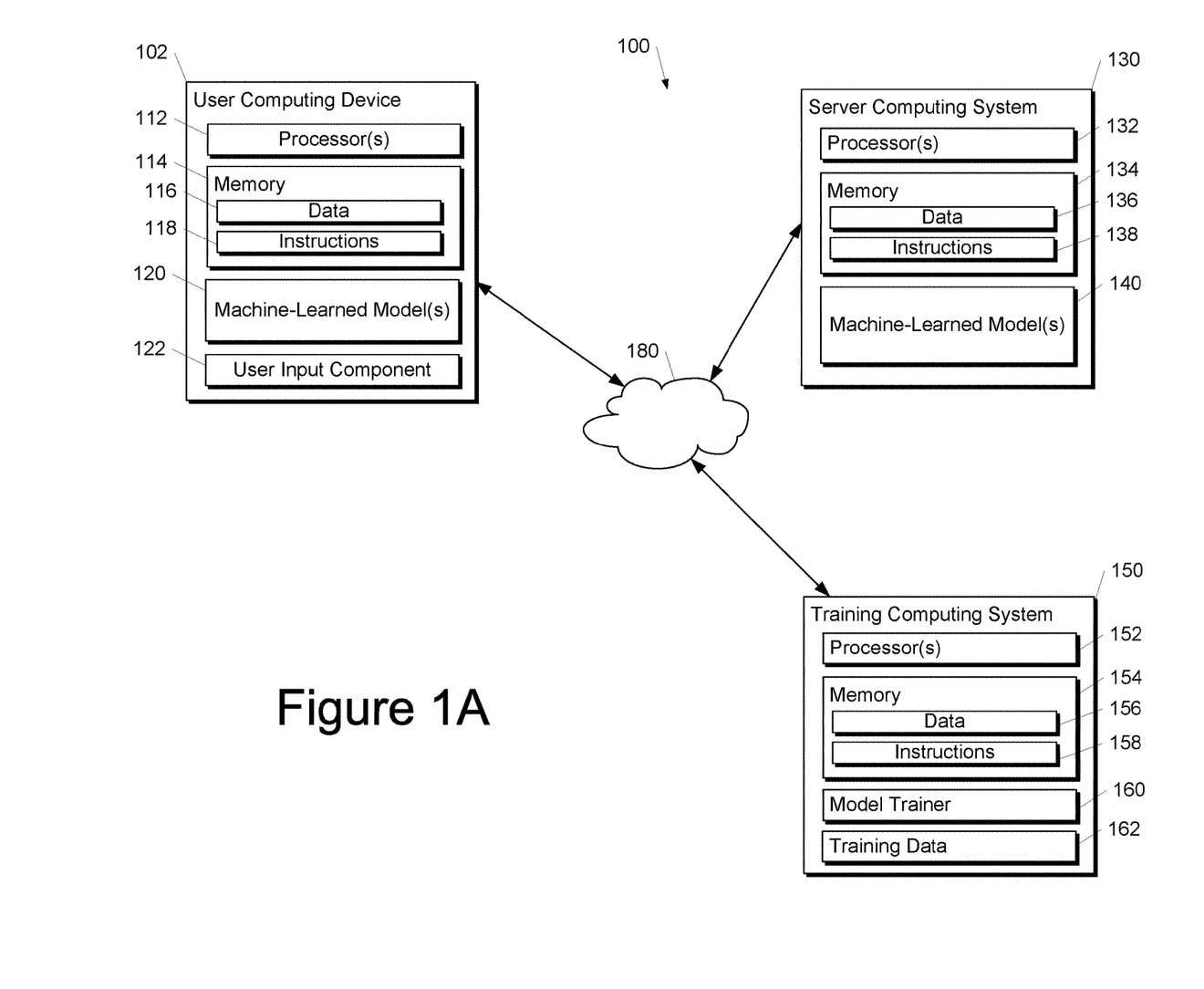
FIG. 1A depicts a block diagram of an example computing system for generating one or more names for one or more entities according to example embodiments of the present disclosure.

FIG. 1A depicts a block diagram of an example computing system 100 for generating one or more names for one or more entities according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more machine-learned object detection models 120. For example, the machine-learned object detection models 120 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Example machine-learned object detection models 120 are discussed with reference to FIGS. 2 through 4.

In some implementations, the machine-learned object detection model(s) 120 can be received from the server computing system 130 over network 180, stored in the user computing device memory 114, and the used or otherwise implemented by the one or more processors 112. In some implementations, the user computing device 102 can implement multiple parallel instances of a single machine-learned object detection model 120 (e.g., to perform parallel name generation across multiple instances of the models 120).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., an image processing service). Thus, one or more models 120 can be stored and implemented at the user computing device 102 and/or one or more object-detection models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned object-detection models 140. For example, the models 140 can be or can otherwise include various machine-learned models such as neural networks (e.g., deep recurrent neural networks) or other multi-layer non-linear models. Example models 140 are discussed with reference to FIG. 3.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that can train the machine-learned models 140 stored at the server computing system 130, for example as described below with reference to FIG. 8 (e.g., using various training or learning techniques, such as, for example, backwards propagation of errors). In some implementations, performing backwards propagation of errors can include performing truncated backpropagation through time. The model trainer 160 can perform a number of generalization techniques (e.g., weight decays, dropouts, etc.) to improve the generalization capability of the models being trained. In particular, the model trainer 160 can train a model 140 based on a set of training data 142. The training data 142 can include training examples, such as training context data, entities to be named, and/or training names. For example, the training data 142 can describes a plurality of entities to named or replaced (e.g., of people, places, etc.) of a geographic area. The training data 142 can include training context data, which can include geographic features, such as cities, roads, buildings, and the like, within the geographic area. The training context data can include common names for people and/or common words in a local language, dialect, etc. for the geographical area.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
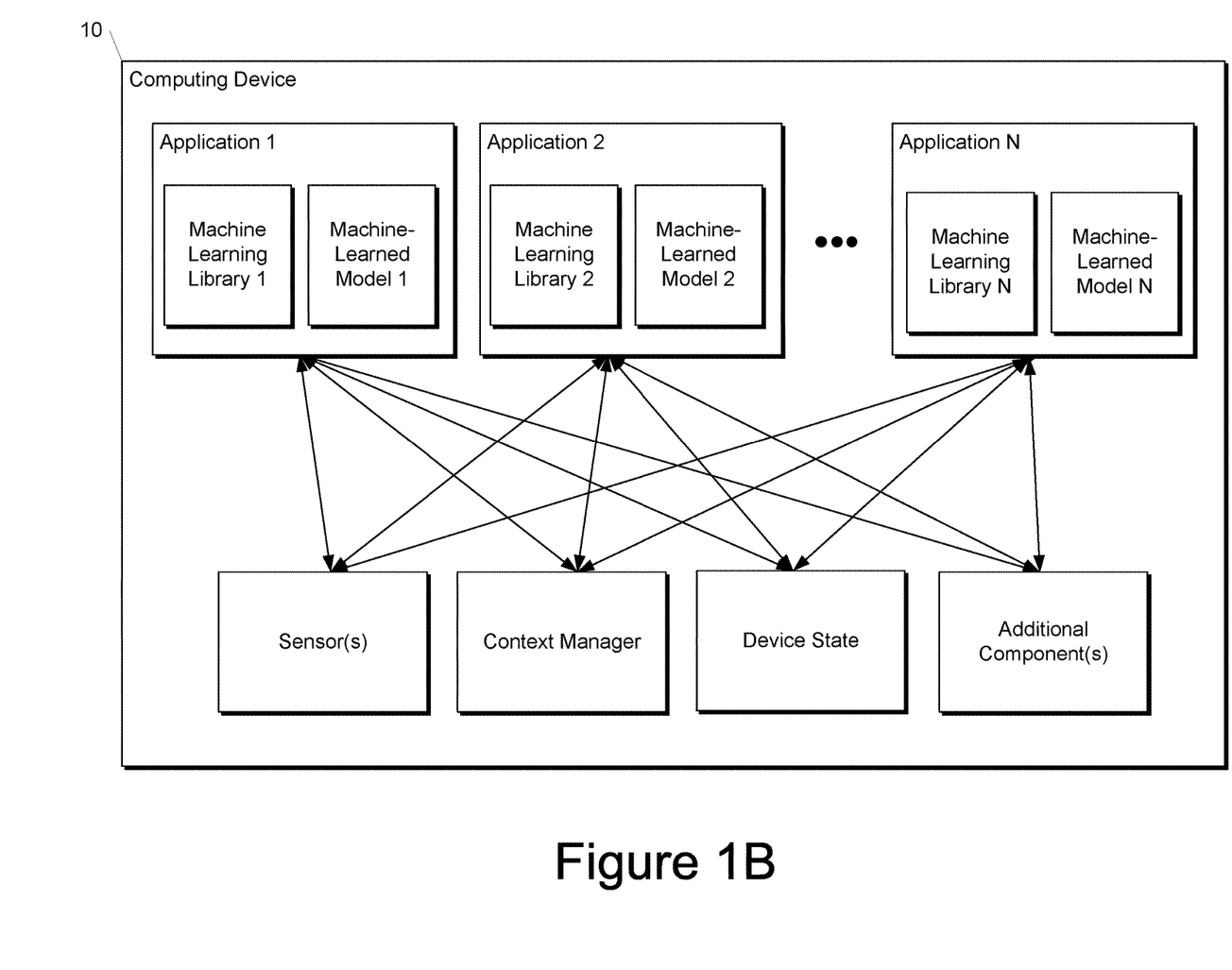
FIG. 1B depicts a block diagram of an example computing device for generating one or more names for one or more entities according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
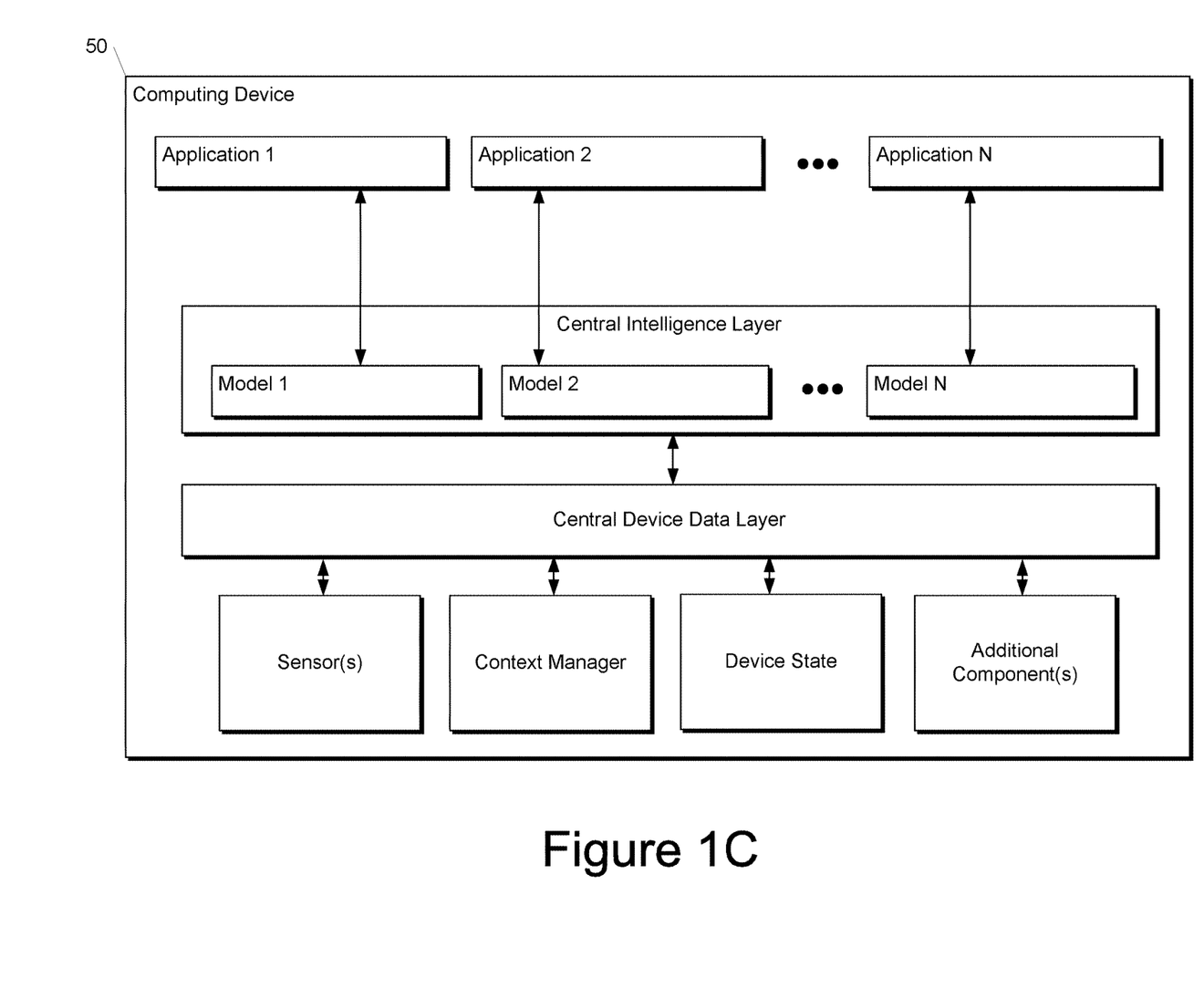
FIG. 1C depicts a block diagram of an example computing device for generating one or more names for one or more entities according to example embodiments of the present disclosure.

FIG. 1C depicts a block diagram of an example computing device 50 for generating one or more names for one or more entities according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
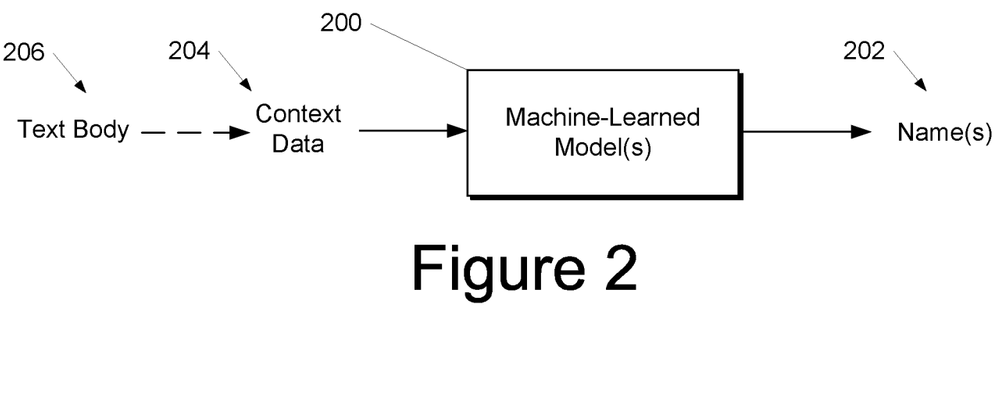
FIG. 2 depicts a block diagram of an example machine-learned model for generating one or more names for one or more entities according to example embodiments of the present disclosure.

Generally, the present disclosure is directed to systems and methods for generating one or more names for one or more entities to be named. Referring to FIG. 2, the systems and methods can leverage one or more machine-learned models 200 to generate the name(s) 202. The systems and methods can be used to generate names 202 including names for people, characters, places, or other entities that are contextually appropriate or relevant. As one example, names of people, places, etc. in a text body 206 can be replaced with the generated names 202 to anonymize the text body 206. Example text bodies 206 include medical reports, articles, police reports, sensitive documents, and the like. As a further example, the generated name(s) 202 can be or include a title or sub-title for the text body 206. As another example, the name(s) 202 can include an anonymous character name for a user when engaging with a virtual environment, such as a chatroom, videogame, collaborative document editing environment (e.g., Google Docs), or the like. As yet a further example, the name(s) 202 can include a brand name for a product, company, etc. that is generated based on context data 204 that includes information about the product, company, etc.

As used herein, "names" can contrast with words or phrases that simply describe the entity to be named (e.g., describing what is depicted in an image) in one or more ways. For example, generated names can include made-up words (e.g., as combinations or concatenations of existing words, or combinations of syllables that are common or appropriate based on the context data). Names can be lack descriptive content of the entity to be named. For example, "Pierre" can be generated as a name or pseudonym for a French person or character. The name "Pierre" is not descriptive of the person, but nevertheless may be appropriate based on the context data. For example, the name may be appropriate based on the culture, language, dialect, etc. of the entity being named or of the intended audience/reader of the name. As another example, names for products and/or companies are often chosen for a variety of factors and can be non-descriptive of the product and/or company. Such factors can include recognizability, ease of spelling and/or pronunciation in one or more languages or cultures, positive associations (e.g., with power, reliability, etc.), a lack of negative associations (e.g., words having negative cultural connotations are often avoided based on the intended market/audience of the name). However, such names are not necessarily descriptive of the entity being named.

In some embodiments, the entity to be named can be or include one or more images or videos (e.g., as a photo album or video collection). The context data 204 can include names assigned to the images or videos included in the photo album or video collection and/or photos or images that are not included in the photo album or video collection. Such context data 204 can describe the user's preferences for naming photos, albums, and/or collections. Thus, the systems described herein can be used to generate names for photos, albums, and/or collections according to the user's preferences for such names.

In some implementations, the machine-learned models 200 can be trained to generate contextually appropriate or relevant names 202 based on context data 204 that includes text. The context data 204 can describe the entity or entities to be named, an intended reader or audience of the names 202, and/or other contextual information. The context data 204 can include geographic location data that describes a location of the entity. Culturally appropriate names 202 (e.g., names) can be generated for the entity based on the location data associated with the entity. For instance, the name(s) 202 can include a pseudonym that is suitable or appropriate with respect to the culture of a user for whom the pseudonym is being generated. The pseudonym can be in a language that is spoken by the user, culturally appropriate based on the culture of the user, and/or relevant or appropriate based on other characteristics of the user.

The context data 204 can include a variety of information, such as information about the entity, target reader, situation in which the names are being generated, and/or any other suitable information. For example, when anonymizing a text body 206, the context data 204 can include some or all of the text body 206, information about a source of the text body 206 (e.g., type, category, etc.), information about obtaining the text body 206, and the like (illustrated by a dotted arrow from the text body 206 to the context data 204). The context data 204 can also include the entity or entities themselves. For instance, the context data 204 can include a report (e.g., a police report, incident report, academic paper, article, etc.) and the entities to be named can include names appearing in the report. The context data 204 can also include information about the entity or entities to be named such as a type, category, property, etc. of the entity or entities to be named. As a result, the generated names can be contextually relevant or appropriate based on the text body 206. For instance, names appearing in a report can be replaced with generated names that are suitable based on the content of the report, suitable based on characteristics of the names being replaced (e.g., considering culture, language, gender, etc. of the name being replaced).

The context data 204 can include information about a geographic region associated with the entity and/or intended reader of the name(s) 202 such that the names are appropriate for a geographical region (e.g., based on a country, region within a country, dialect of the geographical region, etc.). The geographical region can be associated with the entity to be named and/or an intended reader or audience of the entity. Thus, names 202 can be generated that are culturally appropriate or relevant for a specific country, state, region, etc. The context data 204 can also include other information about a target reader of the name 202 or the entity, such as age, profession, time period (for a fictional character), and the like. As such, names of people, places, etc. can be generated that are appropriate and/or relevant for the target reader, for the entity, and/or suitable for replacing a pre-existing name of the entity.

In some implementations, the machine-learned model 200 is trained to receive context data 202 that describes one or more entities to be named and generate output data that describes one or more names 202 for the entity or entities described by the context data 204. The computing system can be configured to obtain the context data 204, input the context data 204 into the machine-learned model(s) 200, and receive the output data that describes the name(s) 202 as an output of the machine-learned model(s) 200. The computing system can be configured to store the name(s) 202 described by the output data, for example for display to a user of the computing system or for transmission to another computing system or device.

In some implementations, the computing system can be configured to extract at least a portion of the context data 204 from a text body 206 and/or extract at least one of the entity or entities to be named from the text body 206. As an example, the computing system can process the text body 206 to identify portion(s) of the text body 206 that should be replaced with generated name(s) 202 (e.g., names that should be replaced with generated names to anonymize the text body 206 such as a report). The computing system can also process the text body 206 to identify portion(s) of the text body 206 that should be used as context data 204 to generate the name(s) 202. As another example, the text body 206 can have pre-existing placeholders for entities (e.g., redacted words or phrases), and the computing system can be configured to locate the pre-existing placeholders and insert the generated name(s) 202 in the respective placeholder(s).

One or more of the name(s) 202 can be displayed in a user interface of the computing device and/or stored by the computing device. In other words, the computing system can select some or all of the name(s) 202 to display and/or store. The computing system can select such name(s) 202 based on respective confidence scores with respect to the name(s) 202. The confidence scores can be output by the machine-learned model(s) 200. For example, the top candidate names 202 can be stored or displayed to the user.

Figure 3:
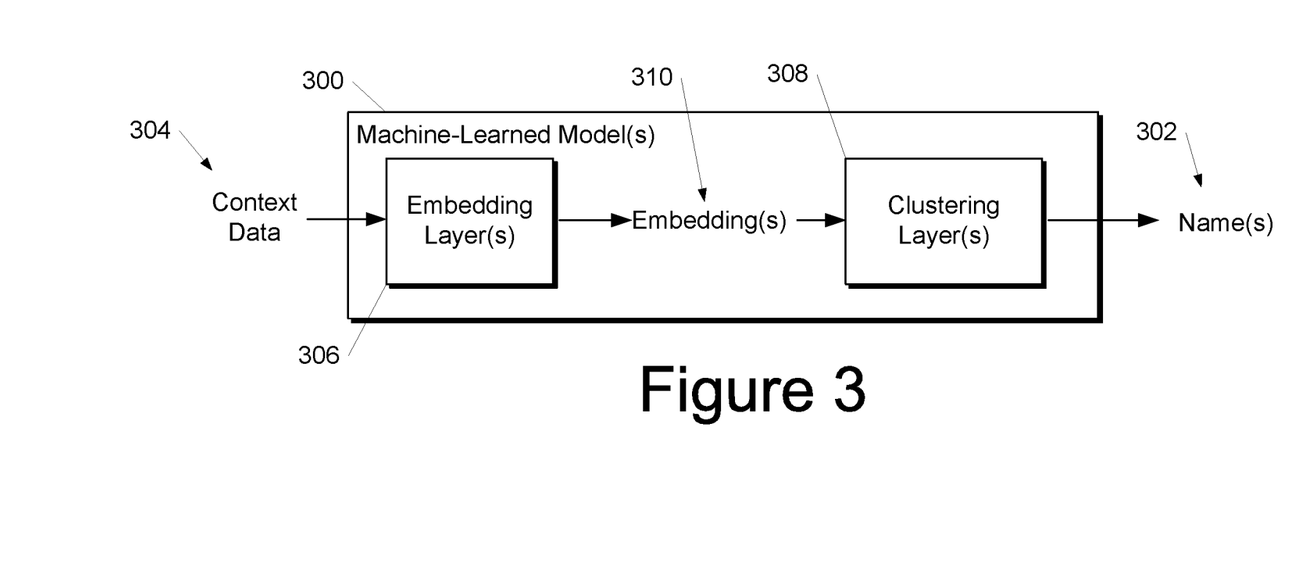
FIG. 3 depicts a block diagram of example machine-learned models for generating one or more names for one or more entities including one or more embedding layers and one or more clustering layers.

FIG. 3 depicts a block diagram of example machine-learned models 300 for generating one or more names 302 for one or more entities to be named that are described by the context data 304. The machine-learned models 300 can include one or more embedding layers 306 or models and one or more clustering layers 308 or models. The embedding layers 306 can be configured to receive the context data 304, and, in response to receipt of the context data 304, output one or more embeddings 310. The embedding(s) 310 can describe feature representations with respect to the context data 304. The clustering layers 308 can be configured to receive the embedding(s) 310 and/or data describing the embedding(s) 310 from the embedding layer(s) 306. In response to receipt of the embedding(s) 310, the embedding layer(s) 306 can output the name(s) 302. The embedding(s) 310 can describe a set of potential candidate names. The clustering layer(s) 308 can rank the candidate names or select a subset of names from the set of candidate names to generate the name(s) 302. For example, the clustering layer(s) 308 can group the candidate names with respect to a number of clusters and/or assign confidence scores to each candidate name. The clustering layer(s) 308 can output some or all of the candidate names as output name(s) 302 based on the ranking, clustering, and/or confidence scores.

Figure 4:
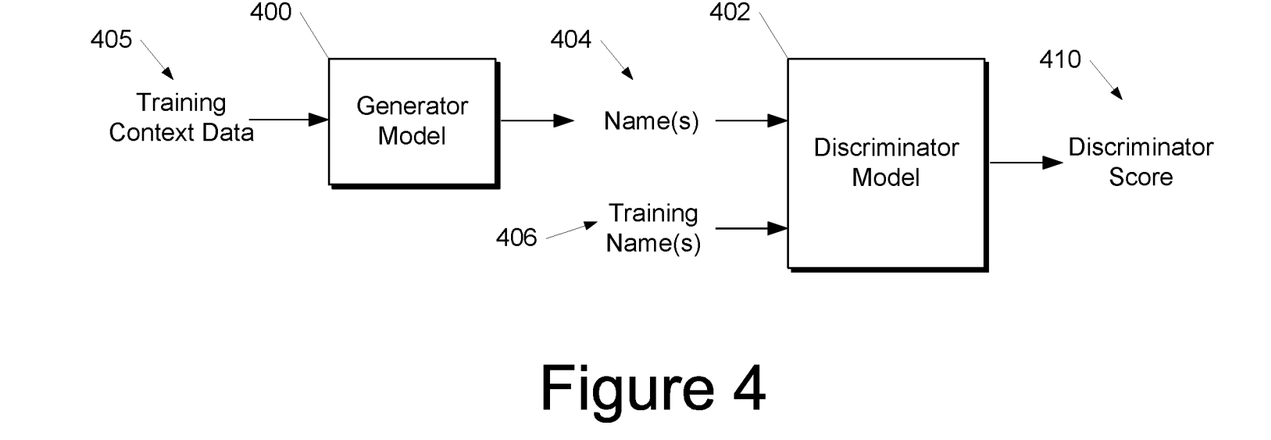
FIG. 4 depicts a training configuration for a generator model in a generative adversarial configuration with a discriminator model according to example embodiments of the present disclosure.

FIG. 4 depicts a training configuration for a generator model 400 according to example embodiments of the present disclosure. The generator model 400 can be trained with a discriminator model 402 in a generative adversarial network (GAN) configuration. The generator model 400 can be configured to generate names 404. Such generated names 404 can include words and/or phrases that are not present in the training context data 405. For instance, the generator model 400 can generate the names 404 on a character-by-character basis and/or word-by-word basis.

The discriminator model 402 can be trained using the generated names 404 and a set of training name(s) 406, which can include "real" or ground truth names for the entities. The generated name(s) 404 and the training name(s) 406 can be input into the discriminator model 402 (e.g., in alternation, randomly, etc.). The discriminator model 402 can output a discriminator score 410 for each input that describes a confidence of the discriminator model 402 with respect to whether each input is a "real" training name 406 or a generated name 404.

In one example, one of the training name(s) 406 can be or include a name of a city. The training context data 405 can include a text body in which the name of the city appears. The generator model can receive the text body as training context data 405 and generate a name that includes a suitable replacement city name. The discriminator model 402 can be trained to determine whether each of the replacement city name (included in the generator name 404) and the training name 406 (including the ground truth city name) is a "real" training name 406 or a "fake" generated name 404. The parameters of the discriminator model 402 can be adjusted during training based on the performance of the discriminator model 402 in such tasks such that the discriminator model 402 is trained to discriminate between generated and ground truth inputs.

Example Methods

Figure 5:
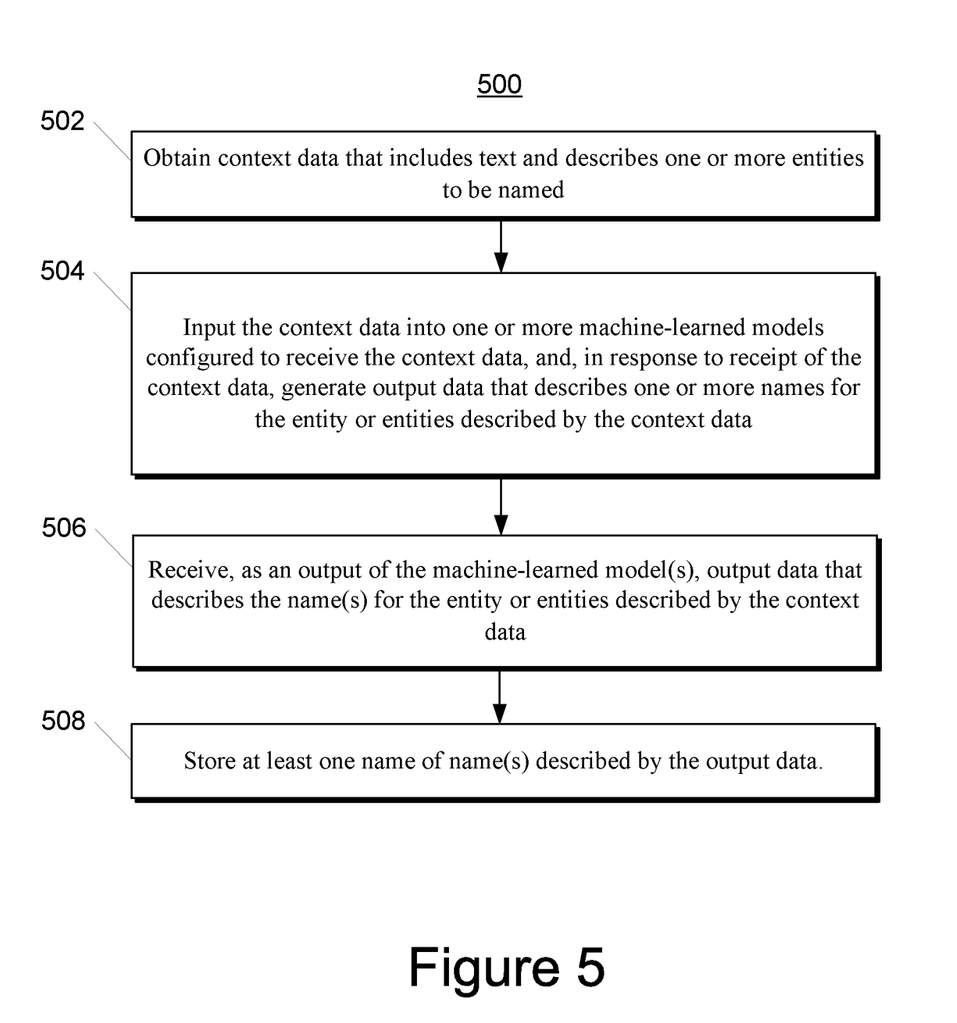
FIG. 5 depicts a flow chart diagram of an example method for generating one or more names for one or more entities to be named according to example embodiments of the present disclosure.

FIG. 5 depicts a flow chart diagram of an example method 500 for generating one or more names for one or more entities according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

The method 500 may include, at 502, obtaining context data that includes text and describes one or more entities to be named. As indicated above, the context data can include information about a geographic region associated with the entity and/or intended reader of the name(s) such that the names are appropriate for a geographical region (e.g., based on a country, region within a country, dialect of the geographical region, etc.). The geographical region can be associated with the entity to be named and/or an intended reader or audience of the entity such that culturally appropriate or relevant names can be generated based on the context data. The context data can also include other information about a target reader of the name or the entity, such as age, profession, time period (for a fictional character), and the like. As such, names of people, places, etc. can be generated that are appropriate and/or relevant for the target reader and/or entity. Thus, the context data can include information suitable for generating names that are customized based on the intended reader or audience of the generated names and/or based on information about the entity.

The context data can be obtained from a variety of sources. For example, a user of the computing device can input the context data into the computing system, for example, into a computer application or web-based service that implements aspects of the present disclosure. The web-based service can be a document anonymizing service, a business name generator service, or the like. The user can select, capture, or input images, video, text, and/or the like that describes an entity to be named using the computing system. As one example, the user can select a text body (e.g., article, report, etc.) to be anonymized from a website or manually input the text body into the computing system via a user input component (e.g., keyboard, touch-sensitive display screen, etc.).

The method 500 may include, at 504, inputting the context data into one or more machine-learned models configured to receive the context data that describes the entity or entities to be named, and, in response to receipt of the context data, generate output data that describes the name(s) for entity or entities described by the context data, for example as described above with reference to FIGS. 2 through 4.

The method 500 may include, at 506, receiving, as an output of the machine-learned model(s), the output data that describes the name(s) for the entity or entities described by the context data, for example as described above with reference to FIGS. 2 through 4.

The method 500 may include, at 508, storing at least one name of the name(s) described by the output data of the machine-learned model(s). For example, the name(s) can be stored in one or more non-transitory computer-readable storage mediums, such as RAM, ROM, EEPROM, EPROM, flash memory devices, magnetic disks, etc., and combinations thereof non-transitory memory. For example, the name(s) can be stored in one or more of the memories 114, 134, 154 described above with reference to FIG. 1A.

Figure 6:
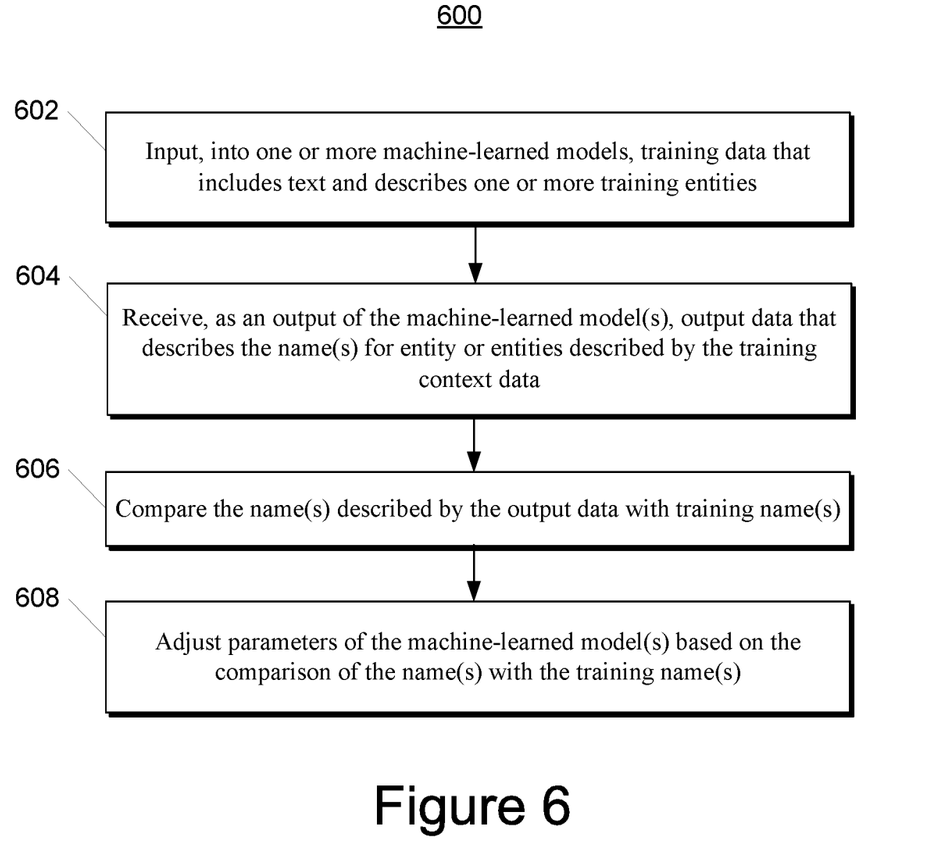
FIG. 6 depicts a flow chart diagram of an example method for training one or more machine-learned model(s) for generating one or more names for one or more entities to be named according to example embodiments of the present disclosure.

FIG. 6 depicts a flow chart diagram of an example method 600 for training one or more machine-learned models to generate one or more names for one or more entities according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

The method 600 may include, at 602, inputting training context data that includes text and describes one or more training entities into one or more machine-learned models. For example, the training context data, which can include geographic features, such as cities, roads, buildings, and the like, within the geographic area. The training context data can include common names for people and/or common words in a local language, dialect, etc. for the geographical area.

The method 600 may include, at 604, receiving, as an output of the machine-learned model(s), output data that describes name(s) for the entity or entities described by the training context data, for example as described with respect to FIGS. 2 through 4.

The method 600 may include, at 606, comparing the name(s) described by the output data with training name(s), for example, the generated name(s) can be compared with respective training name(s) on a word-by-word and/or letter-by-letter basis. For example, a discriminator model can be trained in combination with a generator model as described with respect to FIG. 4. Additionally, names output by the machine-learned model(s) described above with reference to FIGS. 2 and 3 can also be compared with training name(s).

The method 600 may include, at 608, adjusting parameters of the machine-learned model(s) based on the comparison of the name(s) with the training name(s). For example, an objective function can describe the comparison between the name(s) and the training name(s). Errors can be propagated through the machine-learned model(s). The parameters can be adjusted based on a gradient of the objective function with respect to the parameters. As indicated above, in some implementations, the machine-learned models can include various types of models and/or layers. For example, the machine-learned model(s) can include one or more embedding layers or models and/or clustering layers or models, for example as described above with reference to FIG. 3. In such implementations, embedding parameters of the embedding layer(s) and/or clustering parameter of the clustering layer(s) can be adjusted during training of the machine-learned model(s). The embedding layer(s) and/or clustering layer(s) can be trained end-to-end and/or separately. Errors can be propagated through the embedding layers and clustering layers in an end-to-end training configuration.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:
at least one processor;
one or more machine-learned models configured to receive context data that describes one or more entities to be named, and, in response to receipt of the context data, generate output data that describes one or more names for the one or more entities described by the context data; and
at least one tangible, non-transitory computer-readable medium that stores instructions that, when executed by the at least one processor, cause the at least one processor to perform operations, the operations comprising:
obtaining the context data, wherein the context data describes a location of the one or more entities;
inputting the context data into the one or more machine-learned models;
receiving, as an output of the one or more machine-learned models, the output data that describes the one or more names for the one or more entities described by the context data, wherein the one or more names are based on the location of the one or more entities; and
storing at least one name of the one or more names described by the output data.

2. The computing system of claim 1, wherein the one or more machine learned models comprise:
one or more embedding layers configured to receive the context data, and, in response to receipt of the context data, output an embedding, wherein the embedding describes a set of candidate names; and
one or more clustering layers configured to receive data describing the embedding from the one or more embedding layers and rank the set of candidate names, and, in response to receipt of the embedding, output the one or more names.

3. The computing system of claim 1, wherein the one or more machine-learned models comprise a generator model that has been trained with a discriminator model in a generative adversarial network configuration, the operations further comprising:
extracting at least a portion of the context data from a text body;
generating a generated name based on the text body; and
processing the text body to identify a portion of the text body that should be replaced the generated name.

4. The computing system of claim 3, wherein the text body includes a redacted name, and wherein the redacted name is replaced with the generated name.

5. The computing system of claim 1, wherein the context data describes a target reader of the one or more names, and wherein the context data include age and profession of the target reader.

6. The computing system of claim 1, wherein the context data further describes a location of a target reader of the one or more names, and wherein the one or more names are based on the location of the target reader.

7. The computing system of claim 1, wherein the operations further comprise:
extracting at least a portion of the context data from a text body;
extracting at least one of the one or more entities from the text body; and
generating the one or more names based on the context data and the one or more entities from the text body.

8. The computing system of claim 1, wherein the one or more machine-learned models has been trained based on training data that describes a plurality of names of at least one of people or places with respect to a geographic area, and wherein the training data includes common names for people in a local language and dialect for the geographical area.

9. The computing system of claim 1, wherein the operations further comprise providing, for display in a user interface, the at least one name of the one or more names described by the output data.

10. The computing system of claim 1, wherein storing the at least one name of the one or more names described by the output data comprises selecting the at least one name of the one or more names based on respective confidence scores with respect to the one or more names.

11. The computing system of claim 1, wherein the one or more machine-learned models comprise a generator model that is configured to generate one or more names, and wherein the one or more names are not present in the context data.

12. The computing system of claim 1, wherein the one or more names are common in a particular region, a particular dialect, and a particular language associated with the location of the one or more entities.

13. A computer-implemented method for generating one or more names for one or more entities, the method comprising
    obtaining, by one or more computing devices, context data that describes one or more entities to be named, wherein the context data describes a location of the one or more entities;
    inputting, by the one or more computing devices, the context data into one or more machine-learned models configured to receive the context data, and, in response to receipt of the context data, generate output data that describes the one or more names for the one or more entities described by the context data;
    receiving, by the one or more computing devices and as an output of the one or more machine-learned models, the output data that describes the one or more names for the one or more entities described by the context data, wherein the one or more names are based on the location of the one or more entities; and
    storing, by the one or more computing devices, at least one name of the one or more names described by the output data.

14. The computer-implemented method of claim 13, wherein the one or more machine learned models comprise:
    one or more embedding layers configured to receive the context data, and, in response to receipt of the context data, output an embedding, wherein the embedding describes a set of candidate names; and
    one or more clustering layers configured to receive data describing the embedding from the one or more embedding layers and rank the set of candidate names, and, in response to receipt of the embedding, output the one or more names.

15. The computer-implemented method of claim 13, wherein the one or more machine-learned models comprise a generator model that has been trained with a discriminator model in an generative adversarial network configuration, the method further comprising:
    extracting at least a portion of the context data from a text body;
    generating a generated name based on the text body; and
    processing the text body to identify a portion of the text body that should be replaced the generated name.

16. The computer-implemented method of claim 13, wherein the context data describes at least one of a target reader of the one or more names, and wherein the one or more names are based on the location of the target reader.

17. The computer-implemented method of claim 13, further comprising:
    extracting, by the one or more computing devices, at least a portion of the context data from a text body;
    extracting, by the one or more computing devices, at least one of the one or more entities from the text body; and
    generating the one or more names based on the context data and the one or more entities from the text body.

18. The computer-implemented method of claim 13, wherein storing, by the one or more computing devices, the at least one name of the one or more names described by the output data comprises selecting, by the one or more computing devices, the at least one name of the one or more names based on respective confidence scores with respect to the one or more names.

19. A computer-implemented method for training one or more machine-learned models to generate one or more names for one or more entities, the method comprising:
    inputting, by one or more computing devices into one or more machine-learned models, training context data that describes one or more training entities, wherein the training context data describes a location of the one or more training entities, the one or more machine-learned models configured to receive the training context data, and, in response to receipt of the training context data, generate output data that describes the one or more names for the one or more training entities described by the training context data;
    receiving, by the one or more computing devices and as an output of the one or more machine-learned models, the output data that describes the one or more names for the one or more entities described by the training context data, wherein the one or more names are based on the location of the one or more training entities;
    comparing, by the one or more computing devices, the one or more names described by the output data with one or more training names; and
    adjusting, by the one or more computing devices, parameters of the one or more machine-learned models based on the comparison of the one or more names with the one or more training names.

20. The method of claim 19, wherein the one or more machine learned models wherein the adjusting, by the one or more computing devices, the parameters of the one or more machine-learned models comprises:
    adjusting embedding parameters of one or more embedding layers of the one or more machine learned models; and
    adjusting clustering parameters of one or more clustering layers of the one or more machine learned models.

21. The method of claim 20, wherein adjusting, by the one or more computing devices, the parameters of the one or more machine-learned models comprises propagating, by the one or more computing devices, errors through the embedding layers and clustering layers in an end-to-end training configuration.

* * * * *